(12) United States Patent
Sivaraman et al.

(10) Patent No.: US 8,843,518 B2
(45) Date of Patent: Sep. 23, 2014

(54) METHOD AND APPARATUS FOR ESTABLISHING A CONNECTION WITH KNOWN INDIVIDUALS

(75) Inventors: Sundar Sivaraman, Tamil Nadu (IN); Ramprasath Hariharan, Tamil Nadu (IN); Maria M. Sagayaraj, Tamil Nadu (IN); NarayanaDhoss Gopalakrishnan, Tamil Nadu (IN); Rajeswaran Venugopal, Tamil Nadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/551,384

(22) Filed: Jul. 17, 2012

(65) Prior Publication Data

US 2014/0025707 A1     Jan. 23, 2014

(51) Int. Cl.
    *G06F 7/00*     (2006.01)
    *G06F 17/30*    (2006.01)
(52) U.S. Cl.
    USPC ........................................ 707/772
(58) Field of Classification Search
    None
    See application file for complete search history.

(56) References Cited

U.S. PATENT DOCUMENTS

| | | | |
|---|---|---|---|
| 2005/0160167 A1* | 7/2005 | Cheng et al. | 709/224 |
| 2008/0270425 A1* | 10/2008 | Cotgreave | 707/100 |
| 2009/0216639 A1* | 8/2009 | Kapczynski et al. | 705/14 |
| 2009/0285492 A1* | 11/2009 | Ramanujapuram et al. | 382/209 |

OTHER PUBLICATIONS

Chinese Wedding Traditions 1996-2012 [Accessed Oct. 9, 2013], Chinese Historical and Cultural Project, http://www.chcp.org/wedding.html.*

* cited by examiner

*Primary Examiner* — Jason Liao (57) ABSTRACT

Methods and related systems are presented that relate to establishing communications among individuals connected through social networking services. To obtain the contact information of an encountered connection, a person may take a photo of the connection and provide information indicating how he/she knows the connection. Using the provided information, a subset of the person's connections in the social networking services that he/she belongs to is selected. The photos included in the profiles of the connections in the selected subset are searched and a profile that includes an image with features matching the features of the obtained image is selected. Once a match is found, personal information of the connection is obtained from his/her profile and transmitted to the person. The individuals can establish connection using the obtained personal information.

20 Claims, 4 Drawing Sheets

METHOD AND APPARATUS FOR ESTABLISHING A CONNECTION WITH KNOWN INDIVIDUALS

BACKGROUND

Social networking services facilitate building of social networks or social relationships among members. Most social networking services require the members to register with the service and maintain a personal profile with the service. The personal profile often includes personal information (e.g., name, date of birth, location, phone number, email address, etc.) that may be used to identify the profile owner. Further, most personal profiles include an image of the profile owner.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Certain embodiments disclosed herein relate to methods, computer implemented methods, and corresponding systems for establishing contact among individuals. In certain embodiments, an image of a second person, obtained using a camera coupled with a mobile communications device of a first person, may be stored in the mobile communications device. The first person and the second person each belong to at least one social networking service and each have a number of connections in his/her respective social groups. Each social networking service requires members to maintain a personal profile and store some personal information in their personal profile. The first person and the second person have a social networking service in common. The second person maintains a profile on the common social networking service that includes an image of the second person and personal information regarding the second person. A subset of a database of connections is selected. The database of connections maintains information regarding social networking service connections of the first person and the subset of the database is selected based on available information regarding the second person. The selected subset of the database is searched and a profile having an image similar to the image obtained from the second person is determined. The personal information included in the determined profile is provided to the first person.

In some embodiments, communications may be established with the second person using the provided personal information. The established communications includes at least one of a phone call, a video call, or an e-mail communication.

The personal information stored in the personal profile may include at least one of name, age, date of birth, gender, marital status, place of residence, hometown, place of birth, current school, alma mater school, past or present place of employment, field of employment, or work and community experiences of the members.

In some embodiments, the available information regarding the second person may be received from the first person. The available information may indicate at least one of known personal information of the second person, known common social networking services, or known groups within a common social networking service. In some embodiments, the available information regarding the second person may be obtained using at least one of geographical location or global positioning of location where the image of the second person is obtained.

In some embodiments, the profile having the image similar to the image obtained from the second person may be determined by extracting one or more features from the image obtained from the second person, comparing the extracted features to features included in images in profiles included in the subset of the database of connections, and obtaining an image having features similar to the extracted features.

The personal information included in the determined profile may be provided by at least one of displaying the personal information or playing an audio of the personal information.

Figure 1:
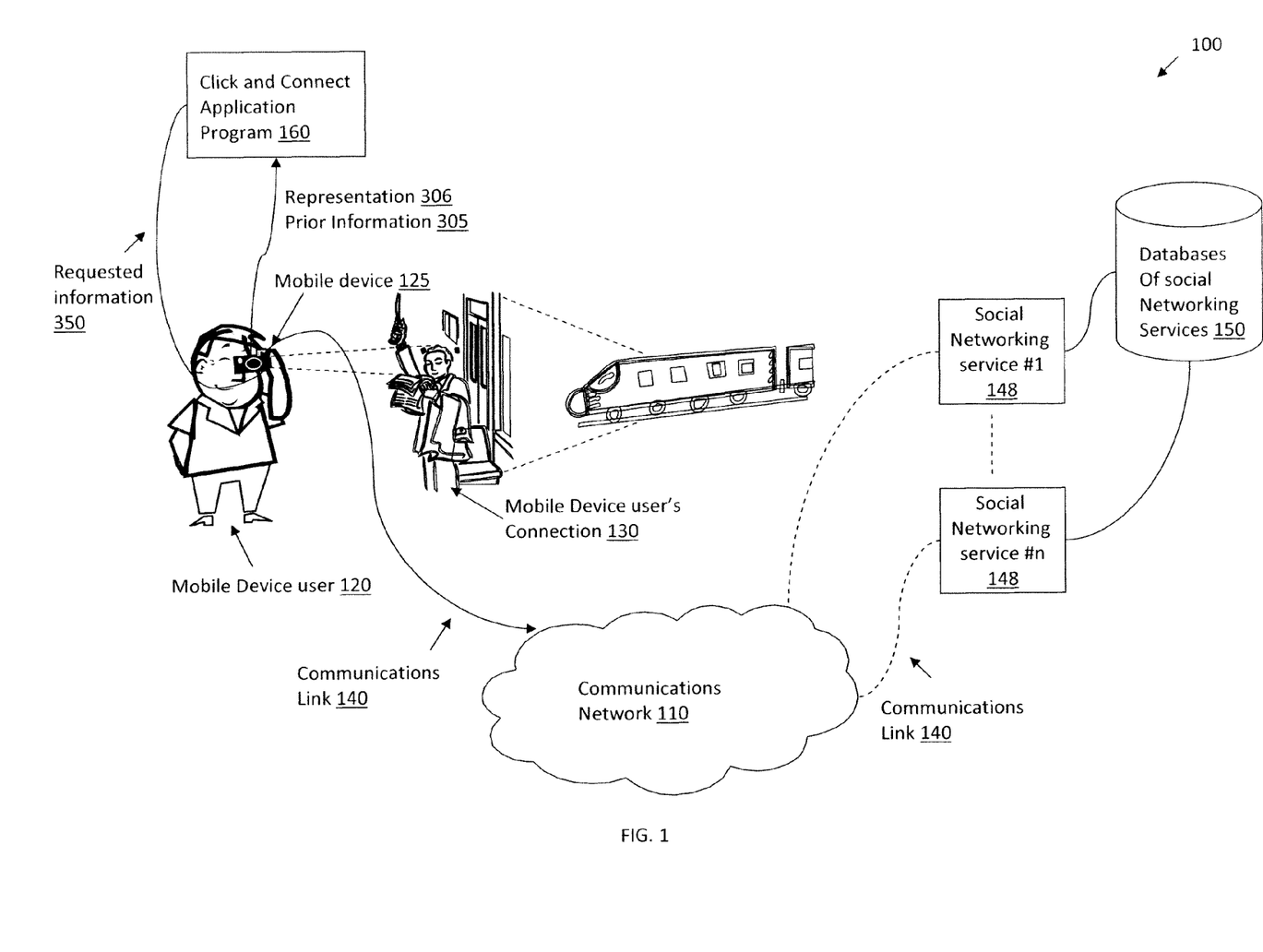
FIG. 1 is an illustration of a perspective view of certain embodiments disclosed herein.

FIG. 1 is an illustration of a perspective view of certain embodiments 100 disclosed herein. As shown in FIG. 1, a mobile device user 120 using a mobile communications device 125 may encounter a connection, friend, or acquaintance 130 (hereinafter collectively referenced as connection 130). The mobile communications device user 120 may wish to obtain certain information, such as the name or contact information of his/her connection 130. The mobile communications device user 120 and his/her friend 130 may belong to one or more online social networking service 148 and have at least one social networking service 148 in common.

The social networking service 148 may be any service, platform, or website that facilitates creating networks or relations among people who share interests, activities, backgrounds, or connections. In some embodiments, the social networking service 148 may be a business-related social networking service. In some embodiments, the social networking service 148 may be a service used to find jobs and recommend business opportunities. In some embodiments, the social networking service 148 may be an online dating service.

In some embodiments, the members of the social networking service 148 may identify other individuals as connections, friends, colleagues, or acquaintances. The members may build their social network by inviting other users to become a connection (i.e., first degree connections). The social networking service may maintain a list of connections for each user. In some embodiments, the social networking service may further maintain a list of second degree connections (i.e., connections of the connections) of each person. Lists of other levels of connections (e.g., third or fourth degree connections) may also be maintained.

In some embodiments, the social networking service 148 may require users to register and create a personal profile (not shown) before using the service. The personal profile of each user may include identifying information, such as name, age, date of birth, gender, marital status, place of residence, hometown, place of birth, current school, alma mater school, past or present place of employment, field of employment, work and community experiences, etc.

In some embodiments, common-interest members of a social networking service 148 may join common-interest groups, organized by workplace, school or college, geographical area, or other characteristics, and categorize their friends into lists, such as "family," "work friends," or "close friends."

In some embodiments, the personal profile may include one or more photos of the profile owner. In some embodiments, the personal profile may include the profile owner's resume or curriculum vitae. In some embodiments, the photos or the resume, included in a members' profile, may be used as an aid in identification of the members.

In certain embodiments, the photos included in a member's personal profile may include labeled blocks of information. For example, in certain embodiments, the images of the individuals may be labeled (i.e., tagged) with identifiers (e.g., name) of those individuals.

In certain embodiments, a member's information, such as photos and resume, may only be available to his/her first degree connections or a limited subset of his/her first degree connection. The connections included in the subset of connections with whom the information is shared may be selected by the member. In certain embodiments, the member's information may be available to his/her connections' connections and their connections. In some embodiments, the member's information may be available publicly.

The mobile communications device user 120 may belong to one or more social networking services 148 (labeled, in FIG. 1, as social networking service #1, . . . , social networking service #n, n≥1). Each social networking service 148 may maintain a database in which the profiles and profile information of the members are stored. For clarity, in FIGS. 1-2, the databases maintained by all of the social networking services 148 to which the mobile communications device user 120 may belong are collectively referred to as databases of social networking services 150.

The mobile communications user 120 may be equipped with one or more mobile communications devices 125. Examples of the mobile communications devices 125 that may be used with the embodiments disclosed herein include, but are not limited to, mobile phones, Personal Digital Assistants, portable televisions, laptop computers, digital video recorders, etc. In some embodiments, the mobile communications device user's connection may also be equipped with his/her mobile communications device (not shown).

The mobile communications device 125 may include a display (not shown) for displaying images and interfaces of various application programs. In certain embodiments, the mobile communications device 125 may include a camera (not shown) for obtaining pictures or videos. In some embodiments, the camera may be a built-in camera. In certain embodiments, the camera may be a separate unit that is coupled (e.g., wirelessly or through a physical connection, such as a network connection) with the communications device 125.

The mobile communications user 120 may connect to a communications network 110, via respective communications links 140, and gain access to various communications features (e.g., voice calls, video calls, data access, web browsing, text messaging, etc.) through his/her mobile communications device 125.

In some embodiments, the mobile communications user 120 may use the mobile communications device 125 to connect to the social networking services 148 to which he/she belongs via the communications network 110 and the communications link 140. In certain embodiments, the mobile communications user 120 may interact with a social networking service 148 via a traditional web browser. In certain embodiments, the mobile communications device user 120 may interact with a social networking service 148 via using an application programming interface (API).

In some embodiments, the mobile communications device 125 may include an application program 160 (hereinafter referenced as the click and connect application program 160) that accesses the databases of the social networking services 150 to which both user 120 and his/her connection 130 belong and obtains identifying information 350 regarding the connection 130.

In certain embodiments, the identifying information 350 may include all available information regarding the connection 130. For example, in some embodiments, the identifying information 350 may include the connection's 130 business and personal phone numbers, email addresses, etc. In some embodiments, the identifying information 350 may be limited as a function of the nature of the relationship between the user 120 and his/her connection 130. For example, if the relationship between the user 120 and his/her connection 130 is of a business-related nature, the identifying information 350 may include the connection's business contact information. Similarly, if the relationship between the user 120 and his/her connection 130 is of a personal nature, the identifying information 350 may include the connection's personal contact information. In some embodiments, if the relationship between the user 120 and his/her connection 130 is categorized as being both personal and business related, both personal and business contact information may be provided.

In some embodiments, the connection 130 may indicate the level of information that he/she wishes to share with those trying to obtain his/her contact information. For example, the connection 130 may make his/her personal information available to only a selected subset of users 120. In some embodiments, the connection 130 may indicate that he/she does not wish to share any information with the user 120. In some embodiments, the connection 130 may select to only share certain contact information with the user 120. For example, the contact 130 may indicate that he/she wishes to only share his/her business email address with the user 120.

Specifically, in some embodiments, the mobile communications device user 120 provides the click and connect application program 160 with a representation 306 of the connection 130 (e g., a photo obtained from the connection 130) for whom he/she 120 wishes to obtain certain information. The click and connect application program 160 connects, via the communications network 110 and communications link 140, to the databases of the social networking services 160 to which the user 120 belongs and searches the databases 160 using one or more known image recognition programs as described in more detail below in order to find a connection whose representation best matches the representation 306. Once a match is obtained, the click and connect application program 160 returns the information 350 obtained from the databases regarding the connection 130 to the mobile communications device user 120. In certain embodiments, a profile image may be declared as matching the obtained image if certain features of the person included in the obtained image, such as height of forehead, height of nose, distance between nose and forehead, and/or skin texture match those of the person included in the profile image.

In certain embodiments, the mobile communications device user 120 may provide the click and connect application program 160 with prior information 305 regarding his/her connection 130. The information provided by the user 120 is used by the click and connect application program 160 to narrow the search for the connection 130 to a subset of the user's connections.

In certain embodiments, certain threshold levels for the amount of similarity, between the image obtained by the user and the profile image, required to constitute a match may be imposed. In certain embodiments, such threshold levels may be imposed by the click and connect application program 160. In some embodiments, the threshold may be variable and the user 120 may be allowed to set or vary the threshold. In certain embodiments, a threshold level of between e.g., 75%-80% may be imposed. This threshold level, for example, may be an average level imposed over all of the features of the person being matched or may be for a selected subset (e.g., 5 of 6 six features match better than 75%). The latter may be useful especially as a feature such as hair length and color may change intermittently.

For example, in one embodiment, the mobile communications device user 120 may provide the click and connect application program 160 with prior information 305 regarding the social networking service 148 (e.g., name of the social networking service) through which he/she believes to have connected with his/her connection 130. Based on this information, the click and connect application program 160 limits its search to the database of the user's connection in the specified social networking service.

In some embodiments, the mobile communications device user 120 may provide the click and connect application program 160 with information regarding the geographical location (e.g., town, country) for which he/she 120 believes to know his/her connection 130 from. In certain embodiments, in place of the prior information 305, the click and connect application program 160 may obtain the current geographical location of mobile communications device user 120 (e.g., through Global Position System (GPS) included in the mobile communications device 125) and use the location information in place of (or in addition to) the prior information 305. Based on this information, the click and connect application program 160 limits its search to the database of the user's connection that are listed as being located in the specified geographical location.

In some embodiments, the prior information 305 may include information regarding a group or a community to which the mobile communications device user 120 and his/her connection 130 both belong. For example, the user 120 may indicate that connection is classified as a college friend in a certain social networking service. In response, the click and connect application program 160 limits its search to the database of the user's connection that are classified as college friends in the specified social networking service.

The click and connect application program 160 may maintain a list of all of the social networking services 148 to which the user 120 belongs. The list of the social networking services 148 to which the user 120 belongs may be provided by the user to the click and connect application program 160. In certain embodiments, the click and connect application program 160 may include an interface that displays available social networking services 148 and allows the user 120 to select the services to which he/she belongs. In certain embodiments, the click and connect application program 160 may automatically search available social networking services 148 to determine if the user 120 maintains a profile in any of the available social networking services 148. For example, assuming that the user's name is "Jane Doe," the click and connect application program 160 may search for all profiles belonging to "Jane Doe" in the available social networking services 148 and prompt the user 120 to select the profiles that he/she would like to link with the click and connect application program 160. In some embodiments, the linking of the user's profiles with the connect application program 160 may be done during an initial set up of the connect application program 160. In certain embodiments, this linkage may be done prior to or at the time of each search. In certain embodiments, the user's 120 login ID, handle, and/or password for accessing each social networking service 148 may also be maintained.

The mobile communications device user 120 may request a variety of information regarding his/her connection 130 from the click and connect application program 160. For example, in certain embodiments, the mobile communications device user 120 may request the name of the connection 130 from the click and connect application program 160. Alternatively or additionally, the mobile communications device user 120 may request information regarding the connection 130, such as age, date of birth, marital status, phone number, email address, home address, etc., from click and connect application program 160.

In some embodiments, the mobile communications device user 120 may encounter a connection 130 in a real life social setting (e.g., as shown in FIG. 1, the connection 130 being on board of a train and the user 120 noticing him/her while leaving the train station). He/she may wish to schedule a meeting with the connection 130 or directly contact the connection 130 via email, text messaging, phone call, a comment or message sent via a social networking service 148. etc. The mobile communications device user 120 obtains a representation 306 (e.g., photo or video) of the connection 130 and forwards the obtained representation 306 to the click and connect application program 160. In some embodiments, the mobile communications device user 120 may also input additional information 305 regarding the connection 130 to the click and connect application program 160. For example, the mobile communications device user 120 may input information 305 regarding how he/she relates to his/her connection 130 and/or through which social networking services 148 he/she 120 is connected to the connection 130. As noted above, general information regarding the location and/or the GPS location information of the location at which the representation 306 is obtained may further be used as prior information 305 for the click and connect application program 160.

The click and connect application program 160 uses the prior information to select relevant databases of the social networking services 160 for a representation that best matches the representation. Specifically, in certain embodiments, the click and connect application program 160 uses the prior information 305 to limit its search of the databases of the social networking services 148 to only the databases that correspond to the prior information 305.

As noted previously, the user may belong to a number of groups or networks within each social networking service. For example, the user 120 may belong to a network of individuals working for a certain company (e.g., colleagues at XYZ law firm) or a network of individuals performing similar tasks (e.g., female patent practitioners). Further, the user may classify his/her connections within certain groups or networks (e.g., close friends, family, etc.). In some embodiments, the click and connect application program 160 may maintain a list of such groups and networks. In such embodiments, the click and connect application program 160 uses the list of groups and networks to accelerate its search of the profiles of the user's connection. For example, upon encountering a connection 130, if the user 120 specifies that the connection is a female patent practitioner, the click and connect application program 160 may limit its search to those social networking services 148 in which female patent practitioner groups or networks are maintained.

In certain embodiments, the click and connect application program 160 may maintain a classification of the social networking services 148. In some embodiments, the social networking services 148 may be classified under categories provided by the click and connect application program 160 or by the user 120. For example, the social networking services 148 may be classified under labels such as business, personal, etc. If upon encountering a connection 130, the user 120 specifies that the connection 130 fits under a certain category of connections (e.g., business connection), the click and connect application program 160 limits its search to the databases of the social networking services 148 classified under the specified label (e.g., business social networking services).

In certain embodiments, multiple levels of classification may be used to further limit the search space of the click and connect application program 160. For example, the user may specify that the connection is a business connection and also a female patent practitioner connection. In response, the click and connect application program 160 limits its search to the social networking services 148 that are labeled/classified as being business related and include female patent practitioner groups or networks.

For example, if the mobile communications device user 120 indicates that he/she believes to know the connection 130 from a certain social networking service 148, the click and connect application program 160 may limit the search to the connections of the user 120 in that social networking service 148. Similarly, if the mobile communications device user 120 indicates that he/she believes to have attended college with the connection 130, the click and connect application program 160 may limit the search to the individuals classified under "college friends." In some embodiments, if the click and connect application program 160 identifies that the mobile communications device user 120 is encountering the connection 130 within a certain locality (e.g., Boston area), the click and connect application program 160 may limit the search to the connections classified under "Boston Area friends." In some embodiments, unions or intersections of groups may be used to form the search field. For example, if the mobile communications device user 120 indicates that he/she knows the connection 130 from college and that they attended college in the Boston area, the click and connect application program 160 may limit the search to the connections included in a set created from obtaining the intersection of the connections included in "Boston Area friends" field and the "college friends" fields. Similarly, if the mobile communications device user 120 indicates that he/she either went to college with the connection 130 or knows the person from his/her neighborhood in the Boston area, the click and connect application program 160 may limit the search to the connections included in a set created from obtaining the union of the connections included in "Boston Area friends" field and the "college friends" fields.

In certain embodiments, the click and connect application program 160 may compare the representation 306 (although various representations may be used, the term image 306 is being used hereinafter to refer to all obtained representations) obtained from the connection 130 against images included in the personal profiles of the connections included in the subset of databases that have been selected for searching.

In some embodiments, the click and connect application program 160 may include a module (feature selector 330, shown later in FIG. 2) that selects and extracts certain features (e.g., shape of the eye, shape of the nose, overall facial shape) of the obtained photo of the connection 130. In certain embodiments, in addition to or in place of performing feature extraction, the click and connect application program 160 may perform face recognition procedures and search for a profile photo that best matches the face of the individual included in the obtained photo of the connection. Further, in some embodiments, the click and connect application program 160 may include a classifier 340 (shown later in FIG. 2) that performs the required classification procedures for obtaining a best match and selecting a personal profile photo that best matches the obtained photo 306. In some embodiments, metric representing the features included in the image 306 may be determined and compared against corresponding metrics of the images included in the profiles of the user's 120 connections.

In certain embodiments, in an event a match is not obtained, the click and connect application program 160 may present the user 120 with a number of profiles or profile pictures and request that the user 120 selects from among the presented profiles the connection 130 whose information the user 120 is trying to obtain.

In some embodiments, the click and connect application program 160 may search the database of first degree connections of the user 120 in order to obtain a match to the connection 130. In some embodiments, the profiles of other connections (e.g., second degree connections, third degree connections, etc.) may be searched. In certain embodiments, only the profiles of the connections who have allowed a search of their profiles may be accessed. In some embodiments, only the profiles of the connections that have made their images available to the user 120 may be searched. In certain embodiments, only the profiles of the connections that have elected to share their identifying information (e.g., name, age, date of birth, gender, marital status, place of residence, hometown, place of birth, current school, alma mater school, past or present place of employment, field of employment, work and community experiences, etc.) may be searched.

In some embodiments, once the requested information 350 is obtained from the click and connect application program 160, the click and connect application program 160 may automatically initiate a connection between the mobile communications device user 120 and his/her connection 130. For example, in some embodiments, the click and connect application program 160 may trigger a calendar invitation for a meeting between the mobile communications device user 120 and his/her connection 130 to be sent to the connection 130, e.g., via the email address obtained during the search. In some embodiments, the click and connect application program 160 may automatically initiate other means of communications, such as a phone call, an email, a text message, etc. The type of communications initiated may be specified by the user 120 at the time of search. In some embodiments, the click and connect application program 160 may maintain a list of the user's preferred communications type and select from the list of preferred communications type. In some embodiments, a priority list of communications types may be maintained by the user. For example, a list including elements, such as, phone call, email, text message, etc. may be maintained. In some embodiments, the click and connect application program 160 may receive input from the mobile communications device user 120 regarding the type of the connection (e.g., phone call, email, text message, calendar invite, etc.) that the mobile communications device user 120 wishes to make with his/her connection 130.

In certain embodiments, the click and connect application program 160 may provide the mobile communications device user 120 with the requested information 350 (e.g., by displaying the requested information 350 on the screen of the mobile communications device 125 or playing audio including the contact information). The user 120 may use the requested information 350 at a later time (e.g., to establish contact with the connection 130).

In an event the click and connect application program 160 is be able to find a match for the connection 130, in some embodiments, the click and connect application program 160 provides the user 120 with a number of profiles that have been determined to have certain levels of similarities with the connection 130 and presents the user with the option of selecting from among the presented connections. In some embodiments, the click and connect application program 160 may present the user with all connections fitting the provided prior information. For example, the click and connect application program 160 may provide the user with a listing of all connections 130 labeled as close friends. In some embodiments, the click and connect application program 160 may indicate to the user 120 that a match was not found and provide the user with the option of another search.

Figure 2:
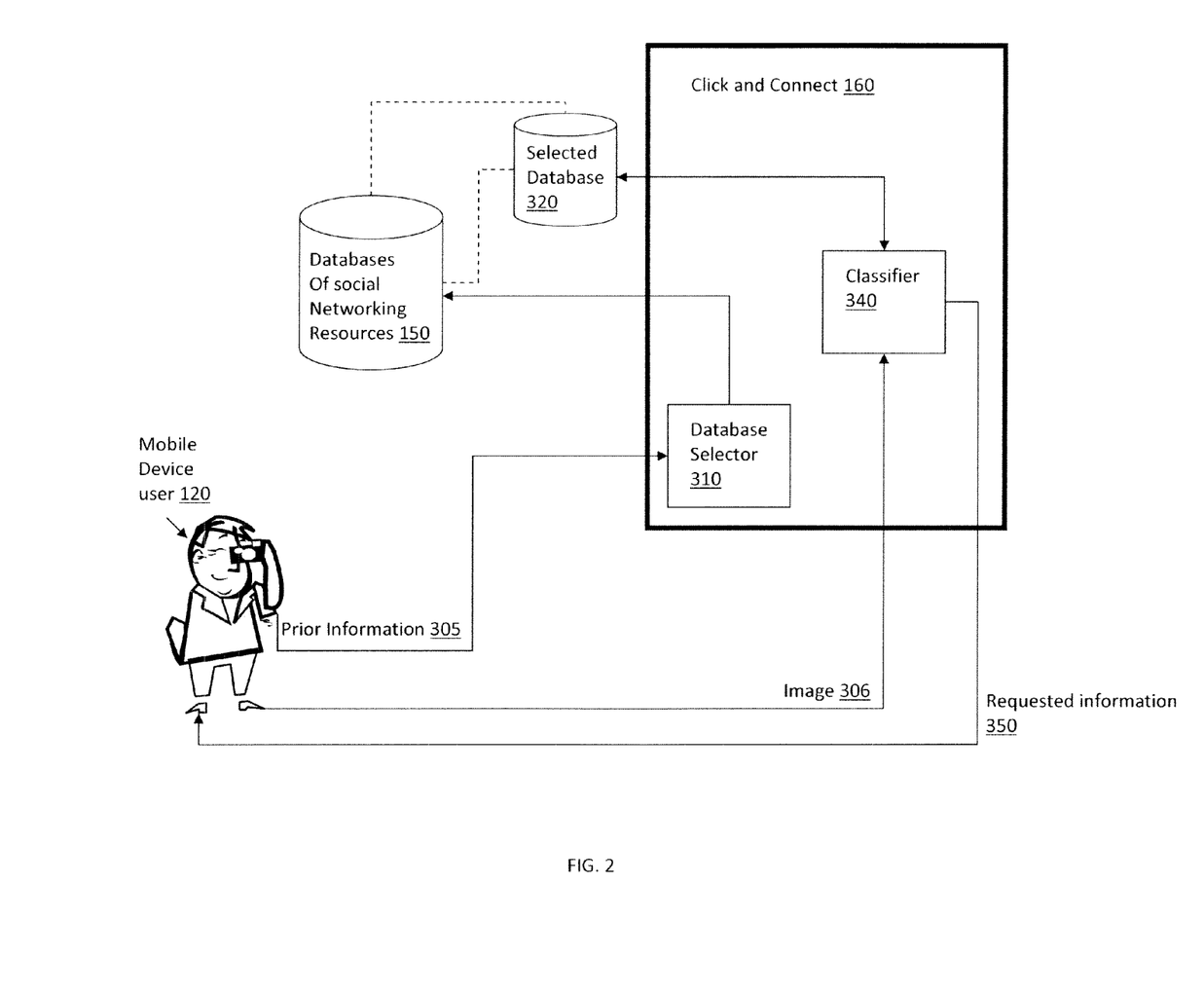
FIG. 2 is an illustration of certain embodiments disclosed herein.

FIG. 2 is an illustration of certain embodiments disclosed herein. As noted previously, the click and connect application program 160 receives information including an image (or photo) 306 of the mobile communication device user's connection 130. The image 306 may be obtained through a digital camera unit (not shown). The digital camera unit may be built-into the mobile communications device 120 or be an independent unit that is coupled to the mobile communications device 120. If functioning as an independent unit, the digital camera unit may be coupled with the mobile communications device 125 via a physical connection (e.g., cable connection) or a wireless link. In certain embodiments, the digital camera unit may be linked with an application programming interface that facilitates the usage of the digital camera unit through the mobile communications device 125. In certain embodiments, the digital camera unit may be directly connected to the click and connect application program. In certain embodiments, the user 120 using an interface (not shown) of the click and connect application program 160 may be allowed to select to work with the camera unit directly through the click and connect application program interface. In some embodiments, every time the user 120 launches the click and connect application program interface, the camera is launched in the click and connect application program interface, allowing the user to quickly take a picture of his/her connection 130 without having to select the camera option.

In some embodiments, the user 120 may store the image 306 in any desired directory in the mobile communications device 125. In certain embodiments, the image 306 may be automatically stored in a directory in the memory 321 (shown later with reference to FIG. 3) of the mobile communications device 125. In some embodiments, the click and connect application program 160 may gain access to the directory containing the image 306 by searching the directories of the mobile communications device 125 for images 306 (for example, recently acquired images). In some embodiments, the user 120 may point out to the click and connect application program 160 the image 306 that should be used to obtain the requested information 350 regarding the connection 130 (e.g., by selecting the connection's image or by dragging and dropping the image into a folder (not shown) designated by the click and connect application program 160). In some embodiments, the click and connect application program 160 may directly obtain the image 306, by providing an interface that the user 120 may use to directly work with the camera and obtain images, and use the obtained image 306 to determine the requested information 350 regarding the contact. The obtained image 306 may be stored permanently in the mobile communications device 120 or be saved in a temporary directory and later disposed. For example, in some embodiments, the obtained image may be disposed of after a period of time (e.g., one day). The time period may be set by the click and connect application program 160 or by the user. In certain embodiments, the obtained image is disposed of once the search is completed.

As noted previously, the click and connect application program 160 may obtain some prior information 305 regarding the connection 130. The prior information 305 may include information obtained directly by the click and connect application program 160 (e.g., GPS information) and/or information obtained from the user 120.

In certain embodiments, the click and connect application program 160 interface may include one or more fields for receiving the prior information 305 from the user 120. For example, the fields may be arranged to receive information (e.g., by the user directly entering the information or selecting the information from a plurality of option). The received information may include name, age, gender, marital status, schools attended, employment information and history, geographical location, social networking service memberships, group memberships, etc. of the connection 130.

In certain embodiments, the click and connect application program 160 may include a database selector 310 that selects at least one appropriate database for searching based on the prior information 305. Specifically, the database selector 310 evaluates the prior information 305 and, based on the prior information 305, determines the social networking services and/or groups to which the connection 130 may belong. The databases of the determined social networking services and groups 320 are selected from among all available databases of the social networking services 150.

The obtained image 306 is forwarded to a classifier 340 that evaluates the similarities between the image 306 and the images included in the selected database 320, and determines one or more images from the database 320 that best matches the obtained image 306.

In certain embodiments, the classifier 340 may include a structural similarities calculator (not shown) that determines the structural similarities between the image 306 and the images included in the selected database 320. For example, in some embodiments, the structural similarities calculator may determine a metric representing the structural information included in the image 306 and determine corresponding metrics, representing similar structural information, for the images included in the selected database 320. The determined metric of the image 306 is compared against the metrics determined for the images included in the selected database 320 and the image having the closest metric to the determine metric of the image 306 is selected.

In some embodiments, the classifier 340 may employ facial recognition schemes to determine the profile image (from among the images included in the selected database 320) that best corresponds to the image 306 obtained from the mobile communications device user's connection 130. In some embodiments, the classifier 340 may include a feature extractor (not shown) that extracts certain features of the connection 130, such as facial features (e.g., size or shape of the eyes, nose, mouth, cheekbones, jaw, relative positioning of the eyes, nose, and mouth), from the image 306. These features are used to search for other images, from among the images included in the selected database 320 that include similar features.

The classifier 340 may use various classification schemes. For example, classifiers such as Zero Rules (ZeroR), Naïve Bayesian, Simple Logistic Regression (Simple Logistic), Support Vector Machine (SMO), k-nearest neighbor (IBk), and Random Forest Regression (Random Forest) may be used.

In certain embodiments, the classifier 340 may return multiple classification results. In such condition, the click and connect application program 160 may prompt the user 120 to select a match from among the multiple classification results. For example, the user 120 may be connected to a person and a close relative of that person through the same social networking service 148. If the connection 130 (from whom the image 306 is obtained) and his/her relative have similar facial features and have been classified under the same group of connection (e.g., if they both attended college with the user 120 and are both classified under "college friends"), the classifier may prompt the user 120 to select between the connection 130 and his/her relative. Once the user makes his/her selection, the classifier 340 presents the user 120 with the requested information for the selected person. In certain embodiments, the classifier 340 may present the user 120 with the requested information 350 for all connections that have been determined to match the obtained image 306. In such case, the click and connect application program 160 provides the user 120 with the option to select his/her desired connection 130 and the connections' information from among the results returned by the classifier 340.

The requested information may be used directly by the click and connect application program 160 to establish contact with the connection 130. In certain embodiments, the click and connect application program 160 may prompt the user 120 to determine, based on user input, the type (e.g., phone call, video call, conferencing call, calendar invite, email, etc.) that the user 120 wishes to make with the connection 130, and establish the connection based on the input received from the user.

In certain embodiments, the requested information 350 may be forwarded to the user (e.g., on the display of the mobile device or played as an audio) for use in establishing contact with the connection 130.

Figure 3:
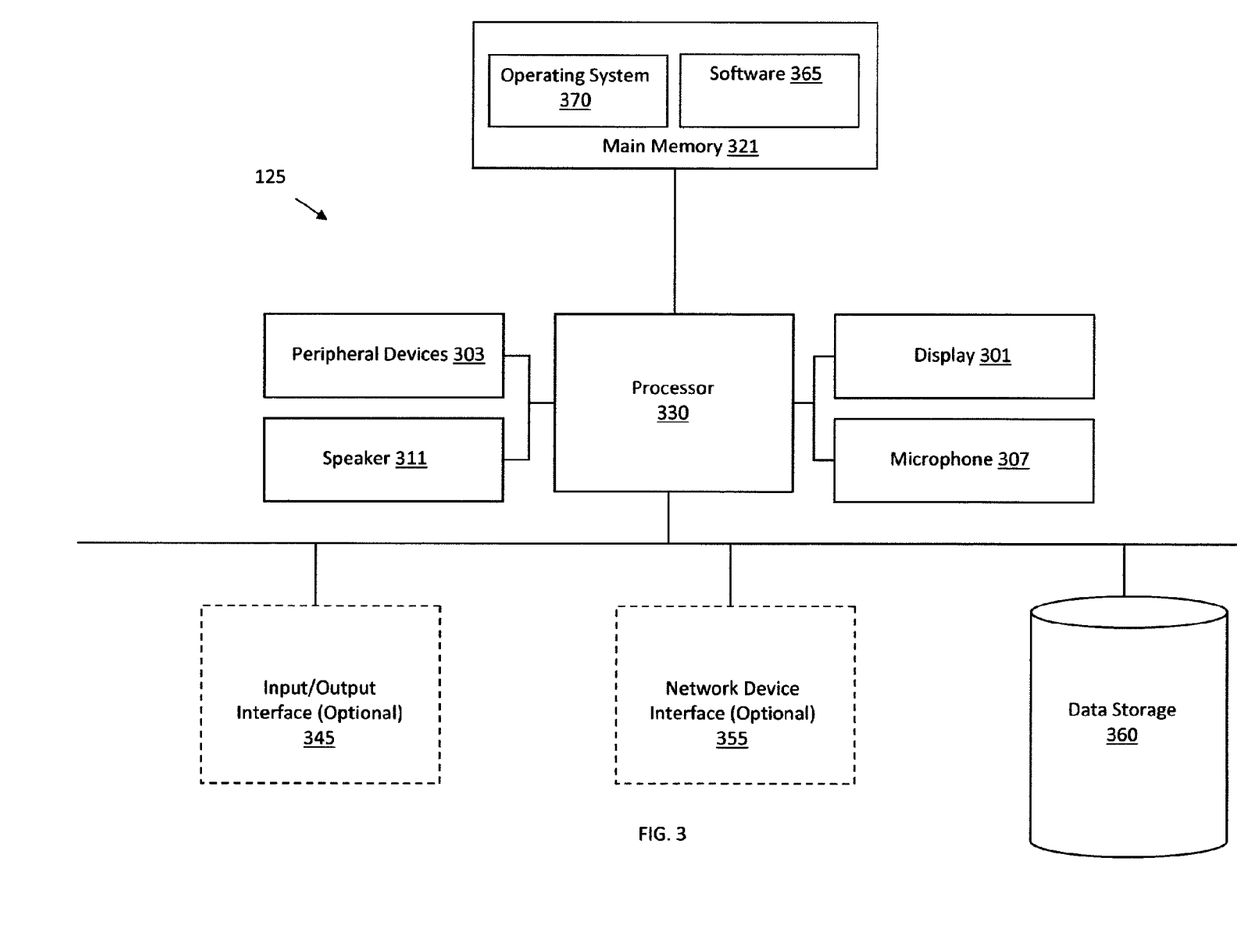
FIG. 3 is a block diagram of a communications device that may be used with certain embodiments disclosed herein.

FIG. 3 is a block diagram of a mobile communications device 125 that may be used with certain embodiments disclosed herein. The device 125 may include a processor 330 (e.g., Central Processing Unit) that carries out the operations of the device, executes various instructions, and manipulates data structures from the main memory 321. The processor 330 may be coupled to a main memory 321. The main memory 321 may be a computer-readable memory and include combinations of non-volatile memory devices. In certain embodiments, the main memory 321 may be included in a subscriber identity module (SIM) card of the mobile communications device 125. In certain embodiments, the main memory 321 may be included in a universal integrated circuit card (UICC) of mobile communications device 125. The main memory 321 may be configured to hold various software 365 and computer-executable instructions and data structures including computer-executable instructions and data structures that implement aspects of the techniques described herein. For example, in some embodiments, the software 365 may implement the procedures for the click and connect application program 160 (shown in FIGS. 1-2).

The main memory 321 may also include an operating system 370 that implements various conventional operating system functions including memory management and controlled access to various devices, such as a database storage 360, and task and process scheduling. The data storage 360 may include content, for use with embodiments disclosed herein, such as images 306, text, video, audio, and computer applications.

The processor 330 may be coupled to various interfaces via an input/output (I/O) device interface 345. The I/O device interface 345 may include logic to interface with various input and/or output devices, such as a keypad or mouse and with the processor 330, and allow signals to be transferred between the processor 330 and other components. Further, interface devices such as speaker 311, microphone 307, peripheral devices 303, and display 301 may be used to transfer signals to/from the processor 330 and main memory 321. In some embodiments, the input/output interface 345 may include a USB port (not shown).

In some embodiments, the device may include a network device interface 355 that provides the device with access to a network connection.

Figure 4:
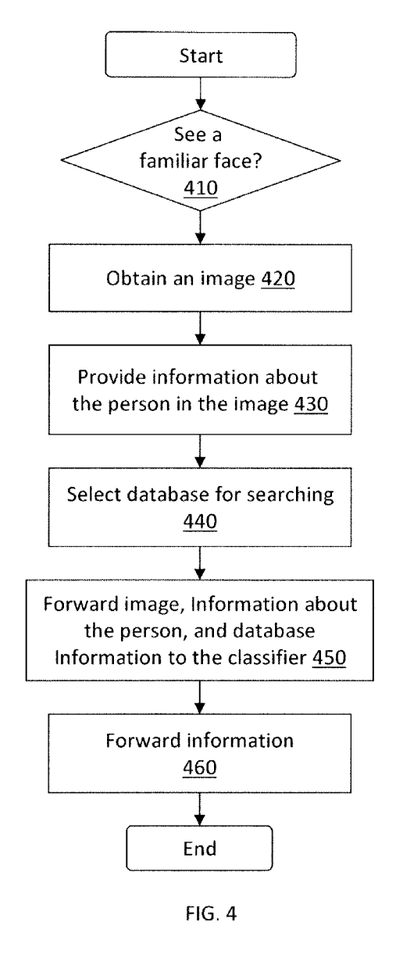
FIG. 4 is a flow diagram of procedures for obtaining information pertaining to the connections of a person on a social networking service, according to certain embodiments disclosed herein.

FIG. 4 is a flow diagram of the procedures that may be used with the click and connect application program disclosed herein. In some embodiments, a mobile communications device user 120 (shown in FIGS. 1-2), upon encountering a person who has been listed as the user's connection on at least one social networking service (step 410), may obtain an image (i.e., photo) of that person (step 420). In some embodiments, the image may be taken through a camera externally linked to the mobile communications device or a camera built-into the communications device. The image may be taken using a camera linked directly to an interface of the click and connect application program. Regardless of how the image is obtained, the obtained image is used by the click and connect application program for obtaining a match to the user's connection.

The user 120 also may provide prior information regarding the connection whose image has been taken (step 430). For example, the user 120 may indicate how she/her knows the connection, to which group of friends the connection may belong, and/or through which social networking service they are connected. In some embodiments, the prior information may be obtained, directly by the click and connect application program and without input from the user, based on information such as the geographical location or global positioning of the location where the image has been taken.

The click and connect application program is linked to the social networking services to which the user belongs and is able to access the database of the user's connections (and their connections, if allowed). Based on the prior information, the click and connect application program selects a subset of the databases of the user's connections in the social networking services for conducting a search (step 440). In some embodiments, the database may be selected by taking the intersection or union of the available databases. For example, if the mobile communications device user 120 indicates that he/she knows the connection 130 from college and that they attended college in the Boston area, the click and connect application program 160 may limit the search to the connections included in a set created from obtaining the intersection of the connections included in "Boston Area friends" field and the "college friends" fields. Similarly, if the mobile communications device user 120 indicates that he/she either went to college with the connection 130 or knows the person from his/her neighborhood in the Boston area, the click and connect application program 160 may limit the search to the connections included in a set created from obtaining the union of the connections included in "Boston Area friends" field and the "college friends" fields.

The click and connect application program forwards the obtained image and the prior information to a classifier that searches the selected subset of databases in order to obtain one or more profiles that include images that best match the obtained image (step 450).

The personal information included in the matching profiles is forwarded to the user (step 460) and may be used by the user to establish contact (e.g., via email, phone call, voice mail, calendar invite, etc.) with the connection.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising steps of:
   storing, in a mobile communications device of a first person, an image of a second person obtained using a camera coupled with the mobile communications device,
      wherein the first person and the second person each belong to at least one of a plurality of social networking services and each of the first and second persons has a number of existing social connections thereon,
      wherein the first person and the second person have one of the social networking services in common, and the second person maintains a profile on the common social networking service that includes a profile image of the second person and personal information regarding the second person;
   automatically selecting, via the mobile communications device, a subset of connections from a database of existing social connections of the first person among the plurality of social networking services, based on available information regarding the second person, the selected subset of connections being a portion but not all of the database of existing social connections of the first person;
   from the mobile communications device, initiating a search of profiles, on one or more of the social networking services, for the selected subset of connections to determine whether a profile of an existing social connection on the one or more of the social networking services contains an image similar to the stored image of the second person; and
   upon determining from the search that a profile on one of the social networking services contains an image similar to the stored image of the second person, providing for the first person via the mobile communications device, personal information included in the profile containing the similar image from the one social networking service,
   wherein the available information regarding the second person includes an identifier of a location of where the image of the second person was obtained.

2. The method of claim 1 further including automatically establishing communications with the second person using the provided personal information.

3. The method of claim 1, further including providing the mobile communications device with a listing of individuals included in the selected subset of connections in an event that the searched profiles do not include any profile containing an image similar to the stored image of the second person.

4. The method of claim 1, further including receiving, at the mobile communications device, the available information regarding the second person from the first person, the available information indicating information known to the first person about the second person.

5. The method of claim 1, wherein the identifier of the location includes a geographical location or a global positioning location.

6. The method of claim 1, wherein the search comprises:
   extracting one or more features from the stored image obtained of the second person,
   comparing the extracted features to features included in images in profiles for the subset of connections, and
   selecting an image having features having similarity to the extracted features that meets or exceeds a threshold.

7. The method of claim 1, wherein providing the personal information includes playing an audio of the personal information.

8. The method of claim 1, wherein the search comprises:
   determining a metric representing structural information included in the image of the second person,
   comparing the structural metric for the image of the second person to metrics representing structural information included in images in profiles for the subset of connections, and
   selecting an image having a structural metric close to the structural metric for the image of the second person.

9. The method of claim 1, wherein one or more of the steps are performed in response to a user input operation on the mobile communications device for selecting the image of the second person from storage on the mobile communications device.

10. The method of claim 1, wherein one or more of the steps are performed in response to a user input operation on the mobile communications device for dragging and dropping the image into a designated folder.

11. The method of claim 1, wherein the step of providing personal information included in the profile containing the similar image is based upon a determination that the second person has authorized sharing of the personal information with a limited class of persons including the first person, for purposes of responding to image based searches.

12. The method of claim 1, wherein the personal information provided includes only information that the second person has selected to share for purposes of responding to image based searches.

13. A system, comprising:
    a database of existing social connections of a first person;
    one or more server platforms of a plurality of social networking services;
    a communication network; and
    a mobile communication device comprising:
      a network device interface configured to be in communication with the communication network;
      at least one memory configured to store an image of a second person from the first person, the first person obtaining the image of the second person using a camera coupled with the device,
      wherein the first person and the second person each belong to at least one of the plurality of social networking services and each has a number of existing social connections thereon,
      wherein the first person and the second person have a social networking service in common, and the second person maintains a profile on the common social networking service that includes a profile image of the second person and personal information regarding the second person;
      programming in the at least one memory;
      a processor configured by the programming to:
        automatically, select a subset of connections from the database of existing social connections of the first person among the plurality of social networking services based on available information regarding the second person, the available information regarding the second person including an identifier of a location of where the image of the second person was obtained, the selected subset of connections being a portion but not all of the database of existing social connections of the first person.
        initiate a search of profiles via the network device interface over the communication network, on a server platform of one of the social networking services, for the selected subset of connections to determine whether a profile of an existing social connection on the one or more of the social networking services contains an image similar to the image of the second person;
        receive a result of the search via the network device interface over the communication network from the server platform of the one of the social networking services; and
        upon determining from the result of the search that a profile on one or more of the social networking services contains an image similar to the image of the second person, obtain personal information included in the profile having the image similar to the image of the second person; and
      an input/output (I/O) device configured to provide the obtained personal information of the second person to the first person.

14. The system of claim 13, wherein the processor is further configured to automatically establish communications with the second person using the provided personal information.

15. The system of claim 13, wherein the processor is further configured to provide the first person with a listing of individuals included in the selected subset of connections in an event the searched profiles do not contain an image similar to the image of the second person.

16. The system of claim 13, wherein the processor is further configured to receive the available information regarding the second person from the first person, the available information indicating information known about the second person to the first person.

17. The system of claim 13, wherein the identifier of the location includes a geographical location or a global positioning location.

18. The system of claim 13, wherein the processor is further configured to determine the profile having the image similar to the image of the second person by initiating functions to:
    extract one or more features from the image of the second person,
    compare the extracted features to features included in images in profiles for the selected subset of connections, and
    select an image having features having similarity to the extracted features that meets or exceeds a threshold.

19. The system of claim 13, wherein the processor is further configured to report the personal information by playing an audio of the personal information.

20. A computer program product comprising a non-transitory computer readable medium having computer readable code stored thereon, which, when executed by a processor of a mobile communications device, causes the mobile communications device to:

store an image of a second person from a first person, the first person obtaining the image of the second person using a camera coupled with the mobile communications device,         wherein the first person and the second person each belong to at least one of a plurality of social networking services and each have a number of existing social connections thereon,         wherein the first person and the second person have a social networking service in common, and the second person maintains a profile on the common social networking service that includes a profile image of the second person and personal information regarding the second person;

automatically select, via the mobile communications device, a subset of connections from a database of existing social connections of the first person among the plurality of social networking services, based on available information regarding the second person, the selected subset of connections being a portion but not all of the database of existing social connections;

initiate a search of profiles, on one or more of the social networking services, for the selected subset of connections to determine whether a profile of an existing social connection on the one or more of the social networking services contains an image similar to the image of the second person; and     upon determining from the search that a profile on one or more of the social networking services contains an image similar to the image of the second person, obtain personal information included in the profile of the second person and make the obtained personal information of the second person available for the first person,     wherein the available information regarding the second person includes an identifier of a location of where the image of the second person was obtained.

* * * * *